May 26, 1970     T. FRAYER     3,514,161

BRAKE PRESSURE CONTROL VALVE

Filed June 11, 1968

INVENTOR.
THEODORE FRAYER

BY

*A. E. Milliken*

ATTORNEY

United States Patent Office 3,514,161
Patented May 26, 1970

3,514,161
BRAKE PRESSURE CONTROL VALVE
Theodore Frayer, North Canton, Ohio, assignor to The Goodyear Tire & Rubber Company, Akron, Ohio, a corporation of Ohio
Filed June 11, 1968, Ser. No. 736,183
Int. Cl. B60t 8/10
U.S. Cl. 303—21                                                           3 Claims

ABSTRACT OF THE DISCLOSURE

A brake pressure control valve in a brake system having a power boost master cylinder and an anti-skid detector. When a skid occurs, an electrical impulse from the skid detector operates a pressure regulator solenoid valve which regulates inlet pressure from a main hydraulic supply. The amount of pressure controlled by the regulator valve determines the relative position of a cavity volume control piston within a brake pressure regulating cavity. A separate hydraulic supply isolated from the main supply is connected between the master cylinder and the brake cylinder. The separate hydraulic supply is connected by a line to one end of the pressure regulating cavity so that changes in the cavity volume brought about by changes in position of the cavity volume control piston cause related changes in the hydraulic pressure to the brake. When the brakes are being applied and a skid condition occurs, the solenoid valve reduces the inlet pressure causing a valve to close off the pressure from the master cylinder to the brake cylinder just before it moves the cavity volume control piston to increase the cavity volume and thereby decreases the hydraulic pressure in the brake.

---

This invention relates to a brake pressure control valve for use in a brake system having a power boost master cylinder and an anti-skid detector.

BACKGROUND OF THE INVENTION

In the prior art, there are many types of pressure control valves designed for use with anti-skid detection devices to reduce or cut off brake pressure in response to the electrical signals from an anti-skid detector. The electrical signal usually operates a solenoid which, in turn, moves a valve to various positions in response to the magnitude of the electrical signal to control the pressure of the hydraulic fluid to the brake and reduce the brake pressure when a skid condition occurs. A typical example of such a patent is U.S. Pat. No. 3,286,734, issued to E. W. Hartshorne. Many of these prior art devices depended upon a main source of hydraulic supply involving the use of a sump for collecting the hydraulic fluid from the return lines of the hydraulic system and a pump for pumping the hydraulic fluid from the sump under pressure to the various parts of the hydraulic system where it is needed. In brake systems which are dependent upon the main hydraulic supply to maintain the braking action, if there is a failure to maintain pressure in the main hydraulic supply, the vehicle will be without brakes. By providing a separate hydraulic supply which is independent from the main hydraulic supply of the vehicle, brake pressure may still be maintained in the vehicle even though the main hydraulic system of the vehicle has failed.

OBJECTS OF THE INVENTION

It is the primary object of this invention to provide a brake pressure control valve which utilizes the main hydraulic supply pressure of a vehicle to control the pressure in a separate independent hydraulic circuit which connects between a master cylinder and the brake.

Another object of this invention is to provide a pressure control valve in which the hydraulic pressure to the brake is reduced during a skid condition by enlarging the cavity volume of a brake pressure regulating cavity to receive part of the hydraulic fluid rather than by dumping the hydraulic fluid into a sump and then having to pump it back into the system to again increase the brake pressure when the skid condition is corrected.

Still another object of the invention is to provide a pressure control valve in a brake system in which loss of pressure in the main hydraulic supply will not leave the vehicle without brake pressure.

A still further object of the invention is to provide a control valve for use with an anti-skid system which valve rapidly and accurately regulates the brake pressure to correct a skid condition in response to a signal from a skid detector.

These and other objects will become more fully apparent as the description proceeds in the following specification and the attached drawings.

DESCRIPTION OF THE PREFERRED EMBODIMENTS

Figure 1:
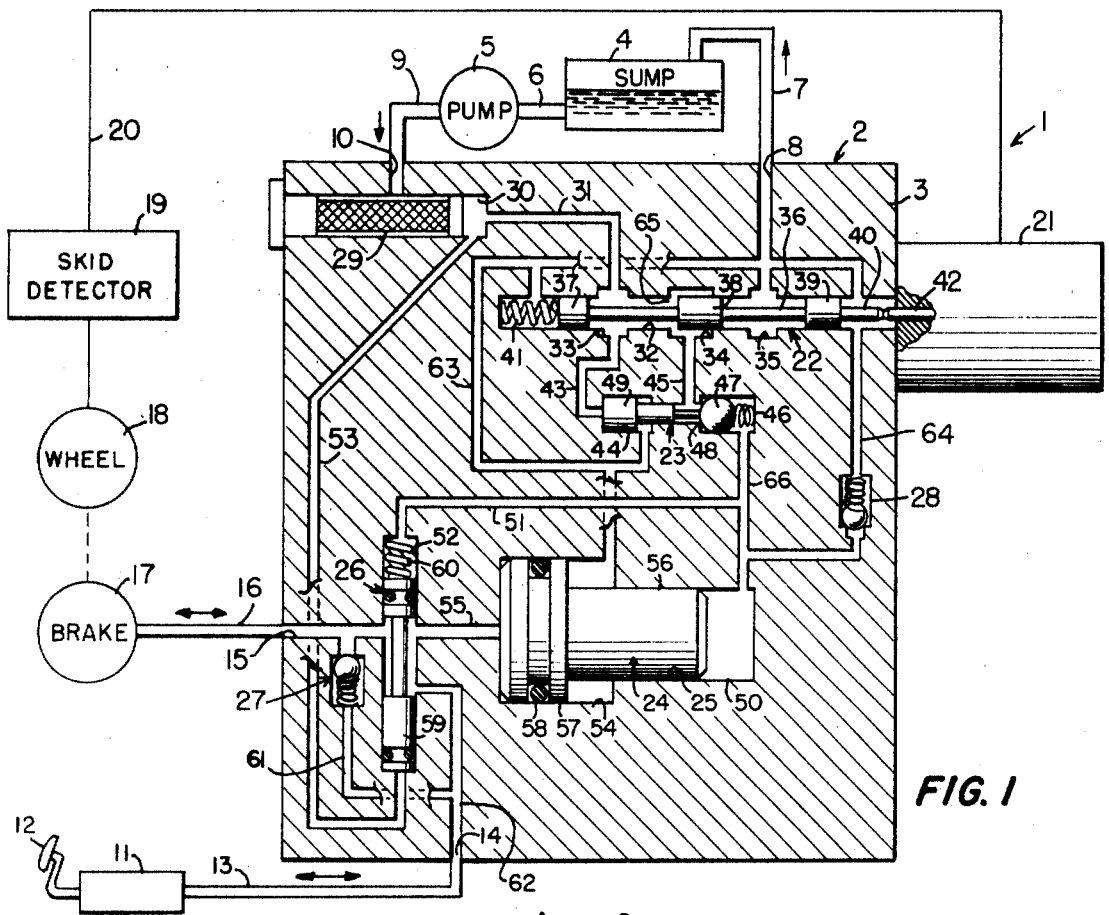
FIG. 1 is a block schematic diagram of the entire brake system of the invention and includes a detailed cross-sectional view of the valve with the internal components thereof in the position they would normally assume when the brakes are applied and there is no pressure in the main hydraulic supply system.

Referring now to FIG. 1 of the drawings, the entire brake system is indicated generally by the numeral 1. A control valve 2 of the brake system 1 has a housing 3. In addition to the control valve 2, the brake system has a sump 4 connected to a pump 5 by a hydraulic line 6. A hydraulic return line 7 connects an outlet port 8 to the sump 4. A hydraulic pressure supply line 9 connects the pump 5 to an inlet port 10. Under normal operating conditions, the pump 5 draws hydraulic fluid from the sump 4 and passes it, under pressure, through the line 9 to the inlet port 10 of the valve 2. A master cylinder 11 operated by a foot pedal 12 is connected by a line 13 to a port 14 in the valve 2. A port 15 is connected by a brake fluid pressure supply line 16 to a brake 17. The brake 17 is operatively connected to a wheel 18 and a skid detector 19 is mounted with respect to the wheel 18 in such manner that when a skid condition occurs in the wheel, the skid detector 19 generates an electrical output signal which passes through a line 20 to a solenoid 21 which operates a supply pressure regulating valve 22. One wheel has been shown for simplicity. However, it is contemplated that the valve 2 may control brake pressure for one or more wheels. A typical skid detector with which this valve may be used to shown in U.S. Pat. No. 3,026,148, issued to E. J. Ruof.

In addition to the supply pressure regulating valve 22, the control valve 2 contains a low supply pressure shut-off valve 23, a cavity volume control piston 24 in a brake pressure regulating cavity 25, a master cylinder shutoff valve 26, a brake release check valve 27 and a thermal relief valve 28.

As will be explained in greater detail later in the specification, there are actually two separate hydraulic circuits passing through the control valve 2. A main hydraulic supply circuit brings hydraulic fluid from the sump 4 through the inlet port 10 and then through the valves 22 and 23 to the cavity 25 for controlling the position of the cavity volume control piston 24. The position of the piston 24, in turn, controls the hydraulic pressure in a master cylinder hydraulic circuit which is connected between the master cylinder 11 and the brake 17 by changing the cavity volume which is occupied by the hydraulic fluid in the master cylinder circuit.

Figure 2:
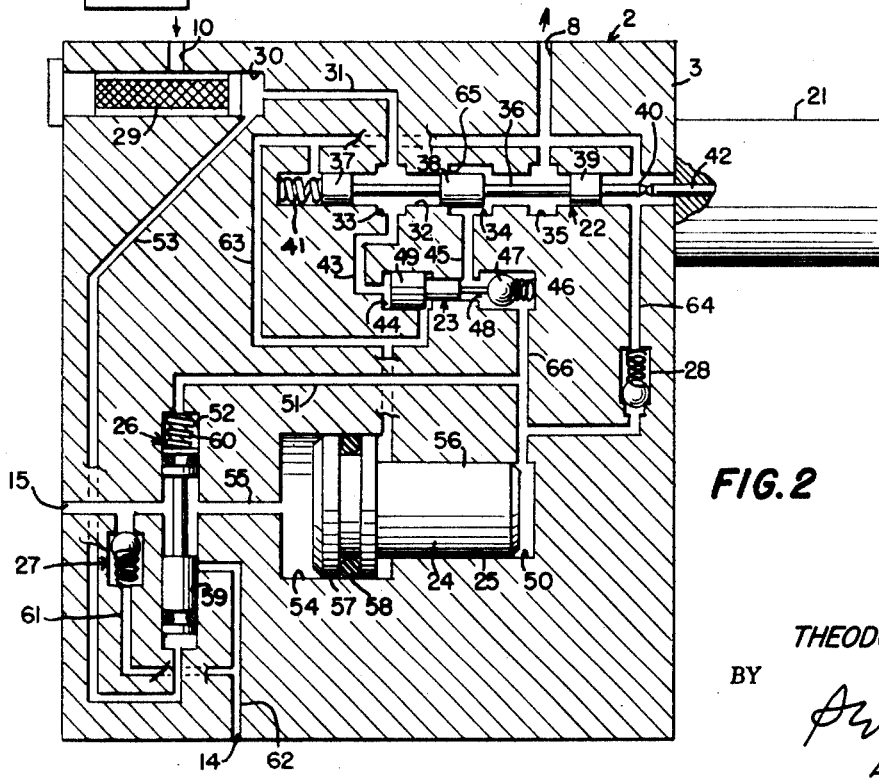
FIG. 2 is a cross-sectional view of the valve shown in FIG. 1 with the internal components of the valve in the position they would normally assume when a skid condition exists during application of the brakes and there is pressure in the main hydraulic supply system.

It should be understood at this point that in order for the automatic anti-skid system to function properly with this valve, it is necessary to have adequate supply pressure from the pump 4 entering the inlet port 10. If the pressure is insufficient or if there is no pressure, as shown in FIG. 1, the anti-skid system will not function. Loss of the main hydraulic supply pressure, however, will not leave the vehicle without brakes since loss of the main supply pressure does not mean that there will be a loss of pressure in the hydraulic circuit from the master cylinder 11 to the brake 17 since this is an isolated independent system from the main hydraulic supply. When the cavity volume regulator piston 24 is in the position shown in FIG. 1 and the brakes are applied, the brake will operate but the anti-skid system will not operate unless there is sufficiently supply pressure entering the inlet port 10, as shown in FIG. 2, to open the valve 23. Valve 26 and regulator piston 24 will remain in positions shown in FIG. 1 with low main hydraulic supply pressures. With the anti-skid system functioning, the valve 26 will cut off the brake pressure from the master cylinder and the pressure in the cavity 25 will position the piston 24 at a location within the cavity 25 to regulate cavity volume in the master cylinder brake system and thereby regulate the pressure to the brake 17.

To describe in greater detail the operation of the control valve 2 and the parts thereof, the hydraulic fluid from the pump 5 passes through a filter 29 positioned in a filter cavity 30. A passage 31 connects the filter cavity 30 with the cylinder 32 of the valve 22. The passage 31 enters the cylinder 32 at an enlarged portion 33. The cylinder 32 also has enlarged portions 34 and 35. Slidably mounted within the cylinder 32 is a piston 36 having lands 37, 38 and 39 mounted on piston rod 40. A spring 41 biases the piston 36 so that the end of the piston rod 40 opposite the spring 41, contacts an axially slidable rod 42 of the solenoid 21. When the solenoid 21 is operated by a signal from the skid detector 19, the rod 42 moves the piston 36 back and forth within the cylinder 32. The pressure control by the valve 22 is accomplished by the relative axial position of the land 38 with respect to the enlarged position 34 of the cylinder 32. The valving action of the land 38 will be explained in greater detail later in the specification. A passage 43 connects the enlarged portion 33 of the cylinder 32 to one end of a cylinder 44 of the low supply pressure shutoff valve 23. A passage 45 connects the enlarged portion 38 of the cylinder 32 to the opposite end of the cylinder 44. A spring 46 biases a ball 47 against an orifice 48 in the cylinder 44 when the pressure through passage 43 has dropped to a certain level thereby permitting the pressure of spring 46 to overcome the hydraulic pressure from passage 43 to the cylinder 44. This ball and spring forms a check valve which closes to prevent loss of fluid in the pressure regulating cavity 24 when there is insufficient pressure in the main hydraulic supply circuit to properly position the cavity volume control piston 24 to maintain sufficient brake pressure in the master cylinder hydraulic circuit.

In FIG. 1, the shutoff valve 23 is shown in the closed position that it assumes when there is insufficient hydraulic pressure to cause the piston 49 of the valve 23 to force the ball 47 open.

In FIG. 2, there is sufficient pressure in the passage 43 to cause the valve 22 to open thereby allowing hydraulic pressure from the passage 45 to pass through the orifice 48 and then through a passage 66 to the small end 50 of a brake pressure regulating cavity 25. Also connected to the passage 66 is a passage 51 leading to one end of a cylinder 52 of the master cylinder shut- off valve 26. The opposite end of the cylinder 52 is connected by a passage 53 to the filter cavity 30. The brake pressure regulating cavity 25 has an enlarged end 54 which is connected by a passage 55 to the cylinder 52 of the master cylinder shutoff valve 26. The cavity volume regulator piston 24 has a small portion 56 which slidably and sealingly engages the small end 50 of the cavity 25 and an enlarged portion 57 which carries an elastomeric seal 58 and sealingly engages the enlarged portion 54 of the cavity 25.

It may now be seen that the small end of the cavity 25 may receive hydraulic fluid from the main hydraulic supply source through the passage 66 and the enlarged end of the cavity 25 may receive hydraulic fluid from a separate source under pressure from the master cylinder 11 and passing through the cylinder 52 and then through the passage 55 to the cavity 25. It may also be seen that the piston 24 may be positioned toward the large end, as shown in FIG. 1 or toward the small end as shown in FIG. 2, depending upon the pressure exerted upon each end of the cylinder. The piston 24 may also assume any number of intermediate positions between either end of the cylinder, again, depending upon the pressure exerted on each end of the cylinder. By changing the position of the piston 24, the cavity volume of the brake line between the master cylinder 11 and the brake 17 may be changed. An increase in cavity volume will decrease the brake pressure and a decrease in cavity volume will increase the brake pressure. A piston 59 is located in the cylinder 52 of the valve 26 and is biased by a spring 60 so that the valve 26 is open when the pressure on both ends of the cylinder 52 is equal. If the pressure in passage 51 drops, the valve 26 closes. When the valve 26 is closed, it cuts off the brake pressure from the master cylinder 11 to the brake 17. The pressure passing through the line 16 to the brake 17 is then totally controlled by the position of the piston 24 which controls the cavity volume as long as the operator applies pedal pressure to the master cylinder 11.

If the operator releases pressure from the master cylinder, a brake release check valve 27 will open and release hydraulic fluid through a passage 61, then through passage 62 connected to port 14 to which is connected line 13 from the master cylinder 11. A pressure release passage 63 is connected from the cylinder 32, the cylinder 44 and the enlarged portion 54 of the cavity 25 to the outlet port 8 to release pressure from the cylinders to the sump 4 and permit movement of the pistons.

The thermal relief valve 28 is connected to a passage 64 running from the passage 66 to the outlet port 7 to release pressure from the cavity 25 and from the cylinder 52 if the valve generates excess pressure due to overheating.

Describing now the operation of the invention, when there is insufficient pressure in the main hydraulic supply system of the vehicle, as shown in FIG. 1, the spring 46 will overcome pressure from the passage 43 against the piston 49 and will drive the ball and the piston to the left to close the orifice 48 of the valve 23 and prevent loss of fluid in the cylinder 25. This locks the piston 24 in a position toward the large end of the cylinder 25 thereby maintaining a low cavity volume and normal brake pressures in the master cylinder hydraulic circuit. Also with low main hydraulic supply pressure, the valve 26 will remain open due to the fluid trapped by valve 23 thereby leaving the master cylinder hydraulic circuit open between the master cylinder 11 and the brake 17. In this situation, brake pressure is maintained, but there is no anti-skid control.

FIG. 2 illustrates a situation where there is adequate supply pressure from the main hydraulic supply to operate the valve 23, the piston 24 and the valves 26 and 22 to provide anti-skid control. The supply pressure has entered the input port 10 and has traveled through the passage 31 into the enlarged portion 33 of the cylinder 32. The skid detector 19 has actuated the solenoid 21 to move the piston 36 to a position where the land 38 has closed off the orifice 65 leading from the enlarged portion 33 to the enlarged portion 34, and the passage 45 of the valve 23 is vented to the return pressure 8 through portion 34 and portion 35. Pressure has passed through the line 43 to one end of the cylinder 44, and this pressure will hold the piston 49 in a position to unseat the ball 47 from the orifice 48 of the valve 23 and permit pressure from the small end of the cavity 25 to be released through the passage 66, through the valve 23 and then through the passage 45 to te enlarged portion 34 of the cylinder 32 where the position of the land 38 leaves an opening between enlarged portions 34 and 35 through which the hydraulic pressure is released and returned to the sump through line 8. With the land 38 of valve 22 preventing the supply pressure to pass through valve 23 to the cylinder 25 and the pressure from the cylinder 25 being released to the sump 4, the pressure on the spring end of the valve 26 is reduced thereby permitting the supply pressure through the passage 53 to enter the opposite end of cylinder 52 and overcome the spring to close the valve 26 and cut off the hydraulic pressure from the master cylinder 11 to the brake 17. With the brake 17 isolated from the master cylinder 11, pressure on the pedal 12 will not apply additional pressure to the brake. Further reduction in pressure in the cylinder 25 permits the pressure in the passage to bear against the large end of the piston 24 and overcome the pressure on the small end causing the piston 24 to move toward the small end of the cylinder 25 and increase the cavity volume affecting the pressure acting on the brake 17.

When the skid detector 19 determines that the skid condition has been alleviated, a signal is sent to the solenoid 21 which, in turn, moves the piston 22 to the right to open the orifice 64 and release pressure through the line 45 and then through the valve 23 to the cavity 25 to move the piston 24 toward the enlarged end 54 to again reduce the cavity volume and thereby increase the pressure in the master cylinder hydraulic system. When the pressure passing through the regulator valve 22 is sufficiently high to equal the pressure passing through the passage 53 to the cylinder 52, the spring 60 will open the valve 26 thereby permitting brake pressure generated by the master cylinder 11 to pass through the line 13 to the brake 17. Each time the skid detector senses a skid, the solenoid 21 repositions the piston 36 of the valve 22 and this position, in turn, determines the position of the piston 24. During a skid situation, if the vehicle operator releases pressure on the foot pedal 12, the pressure on the brake side of the valve 27 will open the valve and release pressure through the passage 61 to the master cylinder. This provides brake pressure release in addition to that released by the change in cavity volume of the cavity 25. The skid detector then signals the solenoid 21 to open the valve 22 and repositions the piston 24 to the left and then opens valve 26 making the system poised for future skid signals.

It should again be stressed that the valve 22 is not merely an on-off valve but is a metering-type valve which can assume an infinite number of positions between completely open and completely closed and likewise, the piston 24 can assume an infinite number of positions determined by the position of the valve 22.

While for the purposes of illustrating the invention, all the elements of the control valve 2 are shown in a single housing, it should be understood that more than one housing may be utilized and the internal components may vary somewhat in construction from those illustrated in FIGS. 1 and 2 of the drawings.

Various other changes can be made in the illustrative embodiments shown herein without departing from the scope of the invention.

What is claimed is:

1. A brake pressure control valve for use on a vehicle brake system having an anti-skid detector, a main hydraulic supply circuit, a master cylinder and a master cylinder hydraulic supply circuit isolated from the main supply circuit, the valve comprising:
   (A) a housing having a brake pressure control cavity therein;
      (1) one end of said cavity being in communication with the main hydraulic supply circuit, and
      (2) the opposite end of said cavity being in communication with a brake line of the master cylinder hydraulic supply circuit;
   (B) a cavity volume control piston within the cavity in sealing engagement therewith and movable between a high cavity volume position and a low cavity volume position;
   (C) a main supply pressure control valve for regulating the pressure from the main hydraulic supply to the control cavity in response to signals from the anti-skid detector;
   (D) a cutoff valve for closing off the pressure from the master cylinder to the brake line when the cavity volume control piston moves to the high volume position to cause a decrease in brake pressure in the master cylinder supply circuit; and
   (E) a check valve to prevent loss of pressure from the control cavity through the main hydraulic supply circuit when the main supply pressure drops below a predetermined level.

2. A valve as claimed in claim 1 including a means to release pressure from the brake line when the cutoff valve is closed.

3. A valve as claimed in claim 1 including a thermal pressure relief valve.

References Cited

UNITED STATES PATENTS 3,286,734   11/1966   Hartshorne _____ 303—21 X
3,322,471   5/1967    Faiver et al. _____ 303—21

MILTON BUCHLER, Primary Examiner

J. J. McLAUGHLIN, Jr., Assistant Examiner

U.S. Cl. X.R.

303—10, 61